United States Patent Office 2,697,110
Patented Dec. 14, 1954

2,697,110

17β-HYDROXY-17α-METHYLETIOCHOLANE-3,11-DIONE AND PROCESS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application May 28, 1953, Serial No. 358,206

3 Claims. (Cl. 260—397.45)

The present invention relates to the synthesis of a steroid compound, and is more particularly concerned with the novel compound, 17β-hydroxy-17α-methyletiocholane-3,11-dione, and with a process for the production thereof.

The novel compound of the present invention may be represented by the structural formula:

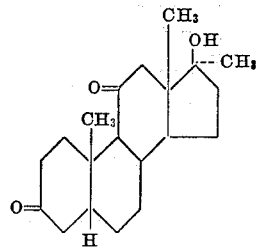

The process of the present invention consists in oxidizing 11α,17β-dihydroxy-17α-methyletiocholan-3-one with chromic acid to convert the 11α-hydroxy group to a keto group and separating the thus-obtained 17β-hydroxy-17α-methyletiocholane-3,11-dione.

It is an object of this invention to provide 17β-hydroxy-17α-methyletiocholane-3,11-dione and a process of preparing the same. Other objects will be apparent to those skilled in the art to which this invention pertains.

The compound of the present invention, 17β-hydroxy-17α - methyletiocholane - 3,11 - dione has utility as a pharmacologically and physiologically active agent. It exhibits anabolic, renotropic and anesthetic activity, while processing only a low androgenic activity. The compound is, furthermore, a valuable intermediate for the synthesis of known chemical compounds. For example, dehydration of 17β-hydroxy-17α-methyletiocholane-3,11-dione with phosphorous oxychloride or hydrogen chloride in glacial acetic acid to produce 17-methylene-etiocholane-3,11-dione, followed by ozonolysis of the 17-methylene group is productive of known etiocholane-3,11,17-trione [Lieberman, J. Biol. Chem., 166, 773 (1946)] which possesses a general anesthetic effect.

The starting compound of the present invention, 11α,17β-dihydroxy-17α-methyletiocholan-3-one, is prepared by the oxidation of 17α-methyltestosterone by means of a mold, the *Rhizopus nigricans* minus strain (Preparation 1), and subsequent hydrogenation of the thus-obtained 11α-hydroxy-17α-methyltestosterone (Preparations 2, 3, 4, and 5).

In carrying out the oxidation step of the present invention, the 11α,17β-dihydroxy-17α-methyletiocholan-3-one dissolved in an organic solvent such as acetic acid, benzene, toluene, petroleum ether, hexanes (Skelly Solve B), dioxane or like solvents and mixtures thereof, with acetic acid and benzene preferred, is oxidized with a solution containing chromic acid. The chromic acid may be added as chromic acid anhydride together with a small but sufficient amount of water to produce the dichromate ion ($Cr_2O_7^{--}$), or may be produced in situ by the reaction between an alkali metal dichromate such as sodium or potassium dichromate and an acid, for example, acetic acid, formic acid, or sulfuric acid. The reaction may be carried out in a heterogeneous or a homogeneous system. If the reaction is carried out in a heterogeneous system, the 11α,17β-dihydroxy-17α-methyletiocholan-3-one dissolved in an organic solvent which is inert to oxidation under the reaction conditions such as benzene, chlorobenzene, bromobenzene, hexane, chloroform, halogenated hydrocarbons, ethyl acetate, or a similar solvent, is admixed with a solution of aqueous sodium dichromate or potassium dichromate acidified with sulfuric acid, or sulfuric acid combined with acetic acid. Vigorous agitation is then employed to bring the organic layer into intimate contact with the aqueous solution. The reaction time is mainly dependent on efficient stirring. In the preferred embodiment of the invention, the oxidation is carried out in homogeneous solution, with acetic acid and benzene as solvent and chromic acid as oxidizing agent, the chromic acid being produced by the reaction of alkali dichromate with acetic acid or sulfuric and acetic acid or by small amounts of water with chromic anhydride. At the termination of the reaction, excess of chromic acid may be destroyed by adding methyl or ethyl alcohol to the solution and concentrating the solution to an oil on a steam bath or in vacuo. The temperature of the reaction is usually maintained between about zero and about fifty degrees centigrade, care being taken at the lower temperatures that the reaction mixture does not freeze, which may be achieved by adding larger amounts of water when chromic anhydride is used. Temperatures between about zero and 25 degrees centigrade are preferred. The reaction time depends on the temperature and may vary between about one-half hour to about ten hours or even longer. At zero degrees centigrade, the reaction time is usually between about one and 24 hours. Thus - obtained 17β - hydroxy - 17α - methyletiocholane-3,11-dione is isolated from the reaction mixture by conventional means, such as extraction with organic solvents, for example, with ether, ethyl acetate, chloroform, methylene dichloride or water-immiscible alcohols and purified by recrystallization and chromatography.

The following examples are illustrative of the process and product of the present invention, but are not to be construed as limiting.

PREPARATION 1.—11α-HYDROXY-17α-METHYLTESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.7 after sterilization. Three liters of this sterilized medium was inoculated with *Rhizopus nigricans* minus strain, American Type Culture Collection Number 6227b, and incubated for 24 hours at a temperature of 28 degrees centigrade using a rate of aeration and agitation such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain was added 1.48 grams of 17α-methyltestosterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the cycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives, obtained upon evaporation of the methylene chloride solvent, weighed 3.3407 grams.

One and ninety-five thousandths (1.095) grams of the solvent-free extractives were dissolved in 110 milliliters of benzene and chromatographed over a column containing 55 grams of alumina which had been washed with hydrochloric acid, then washed with water, and dried for four hours at 120 degrees centigrade. Developing solvents were used in 110-milliliter portions as indicated in the accompanying Table I.

TABLE I

| Fraction | Solvent | Eluate Solids, Milligrams |
| --- | --- | --- |
| 1 | benzene | 13.2 |
| 2 | benzene-ether 9:1 | 11.7 |
| 3 | do | 62.1 |
| 4 | benzene-ether 1:1 | 10.1 |
| 5 | do | 5.5 |
| 6 | ether | 4.0 |
| 7 | do | 4.7 |
| 8 | do | 4.1 |
| 9 | ether-chloroform 19:1 | 6.0 |
| 10 | do | 4.1 |
| 11 | do | 4.8 |
| 12 | ether-chloroform 9:1 | 5.4 |
| 13 | do | 5.9 |
| 14 | do | 4.2 |
| 15 | ether-chloroform 1:1 | 3.8 |
| 16 | do | 11.0 |
| 17 | do | 8.0 |
| 18 | chloroform | 4.2 |
| 19 | do | 113.8 |
| 20 | do | 67.0 |
| 21 | chloroform-acetone 19:1 | 42.8 |
| 22 | do | 20.8 |
| 23 | do | 27.4 |
| 24 | chloroform-acetone 9:1 | 67.2 |
| 25 | do | 56.1 |
| 26 | do | 40.9 |
| 27 | chloroform-acetone 1:1 | 103.4 |
| 28 | do | 31.8 |
| 29 | do | 18.0 |
| 30 | acetone | 19.7 |
| 31 | do | 8.8 |
| 32 | do | 4.2 |
| 33 | acetone-methanol 1:1 | 34.2 |
| 34 | do | 12.3 |
| 35 | do | 6.5 |
| 36 | methanol | 7.4 |
| 37 | do | 2.5 |

Fractions 22 through 28, freed of solvent, were taken up in methylene chloride, slurried with 0.3 gram of Magnesol (magnesium silicate), filtered, evaporated to dryness, and crystallized from four milliliters of ethyl acetate. The resulting crystals were recrystallized from 0.5 milliliter of ethyl acetate to give 98.2 milligrams of 11α-hydroxy-17α-methyltestosterone, having a melting point of 160 to 162 degrees centigrade, and an optical rotation $[\alpha]_D^{23}$ of plus 62 degrees (c. is 1.026 in chloroform).

Analysis:
Percent calculated for $C_{20}H_{30}O_3$ — C, 75.43; H, 9.50
Found — C, 75.59; H, 9.51
C, 75.20; H, 9.54

PREPARATION 2.—PALLADIUM CATAYLST SUPPORTED ON ZINC CARBONATE-ZINC OXIDE MIXTURE

Eleven grams of anhydrous zinc chloride were dissolved in 100 milliliters of water at seventy degrees centigrade and a twenty percent aqueous solution of sodium carbonate was added in excess, with constant stirring, forming a precipitate of zinc carbonate. The precipitate was filtered, washed free of alkali with warm water, and resuspended in 100 milliliters of water forming a slurry. To the aqueous slurry was added five milliliters of a palladium chloride solution containing 0.5 gram of palladium and then one milliliter of thirty-seven percent aqueous formaldehyde solution. The resulting red-brown colored mixture was warmed on a steam bath to about sixty degrees centigrade and a thirty percent aqueous solution of sodium hydroxide then added dropwise, with continual stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for a period of eleven hours. Six and eight-tenths (6.8) grams of a brown-colored catalyst consisting of palladium supported on a zinc carbonate-zinc oxide mixture was obtained.

PREPARATION 3.—11α,17β-DIHYDROXY-17α-METHYLETIO-CHOLAN-3-ONE

Seven hundred and seventy-five (775) milligrams of a mixture of palladium on zinc oxide-zinc carbonate containing 7.5 percent of palladium, suspended in fifteen milliliters of methanol, were hydrogenated at a pressure of twenty pounds per square inch. To this mixture was added a solution of one gram of 11α-hydroxy-17α-methyltestosterone, dissolved in 125 milliliters of methanol. The hydrogenation was then continued at twenty pounds per square inch until one mole equivalent of hydrogen had been absorbed. The catalyst was then removed by filtration and the filtrate was chromatographed over a column containing forty grams of a mixture consisting of activated carbon (Darco G-60) and diatomaceous earth (Celite) in a one to two ratio. The following 220-milliliter fractions were collected.

TABLE II

| Fraction | Solvent | Eluate Solids, Milligrams |
| --- | --- | --- |
| 1 | acetone | 772.0 |
| 2 | do | 74.5 |
| 3 | do | 41.0 |
| 4 | do | 30.0 |
| 5 | do | 19.0 |
| 6 | do | 14.0 |
| 7 | do | 9.5 |
| 8 | do | 8.0 |
| 9 | methylene dichloride | 26.5 |
| 10 | do | 4.0 |
| 11 | do | 0.5 |
| 12 | do | 4.0 |
| 13 | do | 1.0 |

Fraction 1 of the above chromatogram was recrystallized from three milliliters of acetone and one milliliter of Skelly Solve B. After an additional recrystallization from the same solvent mixture, 597 milligrams of 11α,17β-dihydroxy-17α-methyletiocholan-3-one were obtained of melting point 187 to 189 degrees centigrade. The infrared spectrum agreed with the postulated structure.

Analysis:
Percent calculated for $C_{20}H_{32}O_3$ — C, 74.95; H, 10.06
Found — C, 74.85; H, 9.96

*Example 1.—17β-hydroxy-17α-methyletiocholane-3,11-dione*

A solution of 100 milligrams of 11α,17β-dihydroxy-17α-methyletiocholan-3-one in a mixture of two milliliters of benzene and one milliliter of glacial acetic acid was admixed at zero degrees centigrade with a solution of 62 milligrams of sodium dichromate in a mixture of 0.7 milliliter of glacial acetic acid and 0.2 milliliter of benzene. The solution was vigorously stirred for a period of two hours, while kept in an ice-bath. At the completion of this period, 35 milliliters of water were added and the mixture was extracted with three twenty-milliliter portions of a solvent mixture consisting of ether-chloroform in a one to one ratio. The combined extracts were washed with the following ten-milliliter portions: three times with three percent hydrochloric acid solution, twice with water, twice with four percent potassium hydroxide, and twice with water. The ether-chloroform extracts were then dried over anhydrous sodium sulfate and evaporated to give 87 milligrams of solids. These solids were then dissolved in a solvent consisting of 9.5 milliliters of ether and 0.5 milliliter of chloroform and chromatographed over 5.0 grams of alumina which had been washed with hydrochloric acid and dried at 120 degrees centigrade prior to use. The following fractions of ten milliliters each were collected.

TABLE III

| Fraction | Solvent | Eluate Solids, Milligrams |
| --- | --- | --- |
| 1 | ether-chloroform 19:1 | 0.5 |
| 2 | do | 0.4 |
| 3 | ether-chloroform 9:1 | 0 |
| 4 | do | 0 |
| 5 | ether-chloroform 1:1 | 0.1 |
| 6 | do | 12.5 |
| 7 | do | 20.6 |
| 8 | chloroform | 15.2 |
| 9 | do | 28.6 |
| 10 | do | 1.7 |
| 11 | chloroform-acetone 19:1 | 0 |
| 12 | acetone | 5.6 |
| 13–14 | methanol | 6.2 |

Fraction 7 recrystallized from isopropyl ether yielded fifteen milligrams of 17β-hydroxy-17α-methyletiocholane-3,11-dione of melting point 150 to 152 degrees centigrade. The infrared spectrum confirmed the structure as 17β-hydroxy-17α-methyletiocholane-3,11-dione.

*Example 2.—17β-hydroxy-17α-methyletiocholane-3,11-dione*

A solution of 11α,17β-dihydroxy-17α-methyletiocholan-3-one in benzene was agitated for four hours with an aqueous solution of sodium dichromate and dilute sulfuric acid at room temperature. The benzene layer was separated from the aqueous solution, washed, dried over anhydrous sodium sulfate, and evaporated to yield 17β-hydroxy-17α-methyletiocholane-3,11-dione which was purified by recrystallization from an ethylacetate-hexane mixture.

*Example 3.—17β-hydroxy-17α-methyletiocholane-3,11-dione from 11-keto-17α-methyltestosterone*

A. 11-KETO-17α-METHYLTESTOSTERONE 11-keto-17α-methyltestosterone was obtained by oxidation of 11α-hydroxy-17α-methyltestosterone as follows:

A solution of 21.7 milligrams of chromium trioxide in two milliliters of ninety percent acetic acid was added dropwise to a solution of 90.5 milligrams of 11α-hydroxy-17α-methyltestosterone in two milliliters of glacial acetic acid. After standing at room temperature during a period of five hours, the solution was diluted with ten milliliters of methanol and concentrated to a very small volume in vacuo. The residue was taken up with 25 milliliters of water and extracted with two fifty-milliliter portions of a mixture consisting of five parts of ether and one part of methylene dichloride. The extracts were washed twice with ten-milliliter portions of five percent sodium bicarbonate solution and four times with ten-milliliter portions of distilled water. After drying over anhydrous sodium sulfate, the ether was evaporated to give 88.8 milligrams of 11-keto-17α-methyltestosterone. Upon two recrystallizations from aqueous methanol, the product melted at 150 to 152 degrees centigrade. Its structure was confirmed by infrared analysis.

Analysis:
  Percent calculated for $C_{20}H_{28}O_3$__ C, 75.91; H, 8.92
  Found _____ C, 75.16; H, 9.08

B. 17β-HYDROXY-17α-METHYLETIOCHOLANE-3,11-DIONE

Seven hundred and seventy-five (775) milligrams of a mixture of palladium on zinc oxide-zinc carbonate containing 7.5 percent of palladium, suspended in fifteen milliliters of methanol, were hydrogenated at a pressure of twenty pounds per square inch. To this mixture was added a solution of one gram of 11-keto-17α-methyltestosterone dissolved in 125 milliliters of methanol. The hydrogenation was then continued at twenty pounds per square inch until one mole equivalent of hydrogen had been absorbed. The catalyst was then removed by filtration and the filtrate was evaporated. The residue thus-obtained was recrystallized from acetone and acetone-Skelly Solve B (hexanes) to yield 17β-hydroxy-17α-methyletiocholane-3,11-dione.

Similarly, the filtrate resulting from the hydrogenation may be chromatographed to yield 17β-hydroxy-17α-methyletiocholane-3,11-dione.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. 17β-hydroxy-17α-methyletiocholane-3,11-dione.

2. A process for the production of 17β-hydroxy-17α-methyletiocholane-3,11-dione which comprises: oxidizing the 11α-hydroxy group of 11α,17β-dihydroxy-17α-methyletiocholan-3-one to a keto group by mixing 11α,17β-dihydroxy-17α-methyletiocholan-3-one with chromic acid and separating the thus-produced 17β-hydroxy-17α-methyletiocholane-3,11-dione.

3. The process of claim 2 wherein the 11α,17β-dihydroxy-17α-methyletiocholan-3-one is treated with chromic acid at a temperature between zero and 25 degrees centigrade No references cited.